United States Patent [19]

Syrinek et al.

[11] Patent Number: 4,795,574

[45] Date of Patent: Jan. 3, 1989

[54] LOW TEMPERATURE BREAKERS FOR GELLED FRACTURING FLUIDS

[75] Inventors: Allen R. Syrinek, Richmond; Lawrence B. Lyon, Pearland, both of Tex.

[73] Assignee: Nalco Chemical Company, Naperville, Ill.

[21] Appl. No.: 119,931

[22] Filed: Nov. 13, 1987

[51] Int. Cl.$^4$ ............................................. E21B 43/26
[52] U.S. Cl. .................................... 252/8.551; 166/308
[58] Field of Search ......................... 252/8.551, 8.515; 166/308

[56] References Cited

U.S. PATENT DOCUMENTS

| | | |
|---|---|---|
| 2,596,844 | 5/1952 | Clark ................................ 252/8.551 |
| 3,505,374 | 4/1970 | Monroe . |
| 3,757,864 | 9/1973 | Crawford et al. . |
| 3,990,978 | 11/1976 | Hill . |
| 4,152,289 | 5/1979 | Griffin, Jr. . |
| 4,153,649 | 5/1979 | Griffin . |
| 4,174,283 | 11/1979 | Griffin, Jr. . |
| 4,316,810 | 2/1982 | Burnham . |

*Primary Examiner*—Herbert B. Guynn
*Attorney, Agent, or Firm*—John G. Premo; Donald G. Epple; Anthony L. Cupoli

[57] ABSTRACT

A method of breaking gelled viscosities of oil-based gelled fracturing fluids used in low temperature formations having operating temperatures ranging between about 60°–120° F. which comprises treating said oil-based gelled fracturing fluids with an effective amount of a chemical breaker consisting essentially of an effective admixture of hydrated lime and sodium bicarbonate.

6 Claims, No Drawings

LOW TEMPERATURE BREAKERS FOR GELLED FRACTURING FLUIDS

In the fracturing of a subterranean formation for the purpose of enhancing the production of oil and/or gas therefrom, hydraulic pressure imparted by a fracturing fluid is utilized to produce, enlarge and propagate a fracture at a selected location in the formation. The sophistication of such fracturing procedures has attained a high level and extends, in one facet, to the custom preparation and blending of the fracturing fluid utilized in order to optimize its fracturing properties. Fracturing compositions are pumpable liquids, which include oil-base liquids having various additives incorporated therein to improve or achieve certain desirable results when the composition is forced into the formation under high pressure.

It is highly desirable that a fracturing composition exhibit low frictional resistance to the flow of the composition in the well bore conduit during fracturing. Occasionally, the oil-base liquid, such as a diesel oil or perhaps a crude oil, used in fracturing, will itself, and without modification, exhibit adequately low frictional resistance to flow to enable it to be successfully used in some types of subterranean fracturing. However, a number of compounds and mixtures of compounds have been proposed and in some cases used as friction reducing additives and as gellants to the oil-base fluids that are used primarily to provide the hydraulic pressure used for fracturing formations producing oil and/or gas.

These compounds are primarily aluminum salts of aliphatic phosphates as described in U.S. Pat. No. 3,757,864, Crawford, et al, incorporated herein by reference, which compounds are used to both reduce the frictional resistance to flow of an oil-based liquid and also are taught to be useful, at sufficient concentrations, to increase the gel strength of the fracturing compositions. Other types of aluminum salts of phosphate esters are taught to have utility as additives in oil-based fracturing fluids, described by Griffin in U.S. Pat. Nos. 4,174,283; 4,153,649; 4,152,289, all of which are incorporated herein by reference.

In addition, U.S. Pat. No. 4,316,810, incorporated herein by reference, teaches the use of an aluminum phosphate compound which is formed by reacting soluble aluminum salts with a phosphate or phosphonate ester which itself is first prepared by a reacting phosphorus pentoxide or other suitable phosphorus compounds with an ethereal alcohol or mixture thereof, the structure of which will be governed by particular values as described in the above referenced U.S. Pat. No. 4,316,810. The phosphate ester is then reacted with an alkali metal aluminate, an aluminum isopropoxide, an aluminum hydroxide, or like sources, or with aluminum in a reaction that can form the aluminum phosphate ester salts, which salts can act as the gellant for fracturing the subterranean formations.

These aluminum-based gellants are particularly prone to long term viscosity increases of the base oil used in the fracturing formation unless specific chemical breakers are added to the formulation which influence the loss of viscosity of these fracturing fluids over a period of time. These breaker chemicals are primarily those chemicals which can influence the stability of the so-called aluminum phosphate ester association polymer that leads to the viscosity increase necessary for the gellant to function.

Such chemical breakers are described in U.S. Pat. No. 3,990,978, Hill, incorporated herein by reference, wherein, various kinds of breakers are described, particularly useful at temperatures exceeding 125° F.

Although the list of potential compounds which are useful for this breaker purpose is extensive as taught in the Hill Patent, the list does not include hydrated limes, calcium hydroxides, or other hydroxide compounds.

Also, the preferred breaker, sodium acetate, as taught in Table VII and VIII of Hill, does not achieve with regularity sufficent viscosity reductions, particularly at low temperatures.

Therefore, there is a need in the art and the art would be improved with the discovery of a breaker compound which could be used with an aluminum phosphate ester gellant in low temperature formations to achieve fracturing fluids that would lose viscosity within a 20–24 hour period, and within a formation having temperature between about 60°–115° F., and permit appropriate fracturing followed by recovery of formation fluids without problems from high viscosity fracturing fluids.

THE INVENTION

Our invention is a method of breaking gellant viscosities of oil-based gelled fracturing fluid used in low temperature formations, which low temperature formations are operated at ambient temperatures ranging between about 70° F. to about 115° F., and which formations are generating crude oil, gas, or other hydrocarbonaceous liquids, or mixtures thereof. Our method comprises treating said oil-based, gelled, fracturing fluids with an effective amount of a chemical breaker which comprises an effective admixture of hydrated lime and sodium bicarbonate.

An effective amount of chemical breaker can be between about 10 and 70 lbs./1,000 gals. of oil-based fracturing fluid, preferrably between about 15–50 lbs./1,000 gals. of oil-based fracturing fluid and most preferrably between about 20–40 lbs./1,000 gals. of oil-based fracturing fluid.

An effective admixture of our hydrated lime and sodium bicarbonate ranges between about 100 wt. % hydrated lime—0 wt. % sodium carbonate up to and including about 20 wt. % hydrated lime—80 wt. % sodium bicarbonate. Sodium bicarbonate used by itself is totally ineffective for breaking fracturing fluids used in these low temperature formations when the fracturing fluid contains a gellant based on aluminum phosphate or aluminum phosphate ester gellant technology as described above.

The gelled fracturing fluid can contain an organic fluid such as diesel oil or various fractions of crude oil, or mixtures of diesel oil and various fractions of crude oil, or can be formulated from recovered crude oil itself. The gellant primarily used for these low temperature fracturing fluids are gellants taught in the art as being aluminum hydroxy esters formed by reacting appropriate phosphate esters or phosphate hydroxy phosphate esters with a sodium aluminate or similar basic source of aluminum in the presence of the organic fluid making up the oil based fracturing compounds. The gellant is preferably an aluminum complex of an alkyl phosphate ester and may also be an aluminum complex of an alkyl phosphate hydroxy ester. In addition, these gelled fracturing fluids also contain a proppant, such as silica sand of appropriate particle size, and may contain other additives as known in the art.

The formations in which these low temperature fracturing fluids are useful are those formations where the ambient temperature of the formation ranges between about 70° F. to about 115° F. Normally, the formations have ambient temperatures ranging between about 80° F. to about 110° F. with some formations having ambient temperatures ranging between 85° F. to about 105° F.

When the aluminum phosphate ester association polymer complexes are used in formations having such a low ambient temperature, these gellants are difficult to break and as a result such formations stand the risk of plugging. The addition of a chemical breaker, which is added to an oil-based fracturing fluid, causes the viscosity of the gelled fracturing fluid to drop below about 15 cps (centipoise) within 20–24 hrs. or less of application of the fracturing fluid to the formation, while permitting the original viscosity established by the addition of gellant to the fracturing fluid to remain essentially unchanged for a period ranging between 1–6 hrs, preferably between about 1–4 hours. By essentially unchanged viscosity we mean a change of the original viscosity that would be within a value of about 50% of the original viscosity obtained on makeup of a fracturing fluid containing an oil-base such as diesel oil, and the gellants described above. Preferably, the original viscosity ranges between about 100 cps to about 150 cps, or higher.

Low temperature formations are primarily found in the Northeastern section of the United States and also may be found in some sections of Canada. These formations normally are producing hydrocarbon values, such as crude oil or gas from relatively shallow wells operating at ambient temperatures as described above.

LOW TEMPERATURE CHEMICAL BREAKER

Our preferred low temperature chemical breaker is hydrated lime. By hydrated lime, we mean any form of calcium hydroxide such as hydrated lime, dolomitic lime, calcium hydroxide, and the like. The calcium hydroxide can be used by itself or may, preferably, be used in admixture with sodium bicarbonate, which when used by itself, is ineffective for the purpose of breaking gelled fracturing fluids in low temperature formations as described above. As above, the hydrated lime/bicarbonate admixture ranges from 100–10 wt. % hydrated lime and from 0–90 wt. % sodium bicarbonate, preferably between about 100–20 wt. % calcium hydroxide and 0–80 wt. % bicarbonate salts.

EXPERIMENTAL

To demonstrate our invention, we set a goal that, operating at temperatures of from about 70°–115° F., an oil-based gelled fracturing fluid must lose viscosity to a level of at least 15 cps or less within 24 hrs. at a dosage no greater than about 60 lbs. chemical breaker/1,000 gals. fracturing fluid. Several potential chemical breakers were tested. The gellant used was typical of those gellants described above and was manufactured by admixing sodium aluminate solutions with organo phosphate esters in sufficient quantities to form a commercial gellant formulation.

The temperatures that were tested were 75° F., 90° F., and 105° F. Viscosity readings were taken using a Fann 35A viscometer rotating at 100 rpm. All final viscosity readings were at ambient temperatures ranging between about 70°–75° F.

Three potential chemical breakers were used. One contained 10 wt. % magnesium hydroxide, 45 wt. % magnesium carbonate, and 45 wt. % sodium bicarbonate. Another contained 20% hydrated lime and 80 wt. % sodium bicarbonate, a third contained 65 wt. % sodium acetate finely ground in sodium bicarbonate. This latter formula gave excellent results after about 21 hrs., but was not stable in the presence of water, and also gave relatively low results after only 6 hrs. exposure to the test temperatures. As a result this formulation was not tested further, having been judged to be inadequate for actual practice purposes.

The test using 10% magnesium hydroxide, 45% magnesium carbonate, and 45% sodium bicarbonate also was not stable in the presence of water and although it yielded higher viscosities than those obtained from the use of sodium acetate finely ground in bicarbonate as in samples 3 above, the results were still adequate but were judged to be impractical because of the instability observed in the presence of water.

The only formulation listed above which was judged adequate was a formulation which contained 20 wt. % hydrated lime admixed with 80 wt. % sodium bicarbonate and ground to a fine powder which could be dispersed in the fracturing fluid. The addition of this calcium hydrate of lime had concentrations ranging between about 40–60 lbs./1,000 gal. fracturing fluid yielded initial viscosities ranging between about 108–120 cps, viscosities at 2.5 hrs. ranging between about 72–93 cps, viscosities at 6 hrs. ranging between about 60–69 cps, viscosities at 21.5 hrs. ranging between about 8–27 cps, and finally, viscosities at 27.5 hrs. which range between about 6–14 cps, and at low dosage, 22 cps.

In addition, these materials are found to control fluid loss of the gellant into the formation. Fluid loss data was acquired, for example, of a chemical breaker formulation which contained 60 wt. % calcium hydroxide and 40 wt. % sodium bicarbonate. Fluid loss showed that this sample, under standard test conditions measuring fluid loss, yielded a fluid loss of 5 mls, 6 mls, 7 mls, 8 mls and 9 mls over periods of 1 min., 4 min., 9 min., 16 min. and 25 min., respectively. Untreated, the fluid loss was, for these same test periods, 27 mls, 42 mls, 52 mls, 59 mls and 64 mls, respectively. These formulations of hydrated lime containing chemical breakers provide excellent fluid loss properties.

To further demonstrate the efficacies of our calcium hydroxide chemical breakers when used in gelled oil systems formulated as fracturing fluids, the following tables are presented.

TABLE I

| | | | | (viscosities cps) | | | |
|---|---|---|---|---|---|---|---|
| WATER (%) | SAMPLE | CONC. (PPTG) | INITIAL VIS (cps) | 1 hr. | 4 hrs. | 6 hrs. | 20 hrs. |
| 0.00 | BLANK | 0 | 99 | 96 | 87 | 84 | 60 |
| 0.00 | A | 10 | 99 | 87 | 81 | 72 | 60 |
| 0.00 | A | 20 | 96 | 81 | 75 | 69 | 54 |
| 0.00 | A | 30 | 93 | 81 | 75 | 66 | 36 |
| 0.00 | A | 40 | 90 | 78 | 69 | 54 | 21 |
| 0.00 | B | 10 | 102 | 87 | 78 | 75 | 54 |
| 0.00 | B | 20 | 102 | 78 | 66 | 63 | 21 |
| 0.00 | B | 30 | 96 | 66 | 51 | 36 | 9 |
| 0.00 | B | 40 | 90 | 63 | 42 | 24 | 6 |
| 0.00 | B | 50 | 90 | 51 | 24 | 12 | 6 |
| 0.05 | BLANK | 0 | 102 | 96 | 90 | 84 | 63 |
| 0.05 | A | 10 | 90 | 75 | 69 | 66 | 39 |
| 0.05 | A | 20 | 84 | 72 | 60 | 42 | 18 |

TABLE 1-continued

Effect of Water on Breakers

| WATER (%) | SAMPLE | CONC. (PPTG) | INITIAL VIS (cps) | 1 hr. | 4 hrs. | 6 hrs. | 20 hrs. |
|---|---|---|---|---|---|---|---|
| 0.05 | A | 30 | 84 | 63 | 36 | 15 | 6 |
| 0.05 | A | 40 | 84 | 60 | 24 | 9 | 6 |
| 0.05 | B | 10 | 90 | 81 | 63 | 57 | 36 |
| 0.05 | B | 20 | 87 | 66 | 48 | 24 | 9 |
| 0.05 | B | 30 | 81 | 48 | 18 | 6 | 6 |
| 0.05 | B | 40 | 57 | 36 | 9 | 6 | 6 |

Run at 105° F. with commercial gellant (aluminum alkyl phosphate ester) on Fann 35A at 100 rpm.
PPTG = Pounds per thousand gallons of oil-based fracturing fluid.
cps = Viscosity in centipoise as measure on Fann 35A viscometer at 100 rpm.
Breaker A = 20/80 wt. % ratio of lime/sodium bicarbonate
Breaker B = 40/60 wt. % ratio of lime/sodium bicarbonate

TABLE 2

Calcium Hydroxide Breakers at 105° F. Gelled Oil Breaker Data

| sample | conc. (pptg) | initial (cps) | 2 hrs. (cps) | 4 hrs. (cps) | 6 hrs. (cps) | 20 hrs. (cps) |
|---|---|---|---|---|---|---|
| Blank | 0 | 72 | 84 | 75 | 72 | 60 |
| Blank | 0 | 99 | 96 | 87 | 84 | 60 |
| C | 10 | 96 | 78 | 75 | 72 | 60 |
| C | 20 | 96 | 75 | 72 | 60 | 15 |
| C | 30 | 90 | 72 | 57 | 33 | 6 |
| C | 40 | 84 | 66 | 33 | 12 | 6 |
| B | 10 | 63 | 78 | 75 | 69 | 30 |
| B | 10 | 102 | 87 | 78 | 75 | 54 |
| B | 20 | 60 | 75 | 57 | 33 | 6 |
| B | 20 | 102 | 78 | 66 | 63 | 21 |
| B | 30 | 60 | 60 | 30 | 6 | 6 |
| B | 30 | 96 | 66 | 51 | 36 | 9 |
| B | 40 | 84 | 39 | 6 | 6 | 6 |
| B | 40 | 90 | 63 | 42 | 24 | 6 |
| B | 50 | 90 | 51 | 24 | 12 | 6 |
| D | 10 | 63 | 78 | 72 | 57 | 9 |
| D | 20 | 60 | 72 | 36 | 9 | 6 |
| D | 30 | 60 | 9 | 6 | 6 | 6 |
| D | 40 | 84 | 6 | 6 | 6 | 6 |

Diesel, containing commercial gellant, Fann 35A at 100 rpm
Breaker C = 30/70 wt. % ratio of calcium hydroxide/sodium bicarbonate.
Breaker D = 50/50 wt. % ratio of calcium hydroxide/sodium bicarbonate.

TABLE 3

Dolomitic Lime as a Breaker

| SAMPLE | CONC. (PPTG) | INITIAL VIS (cps) | 2 hrs. | 4 hrs. | 6 hrs. | 20 hrs. |
|---|---|---|---|---|---|---|
| Blank | 0 | 141 | 138 | 129 | 123 | 99 |
| B | 40 | 141 | 69 | 36 | 15 | 6 |
| B | 50 | 150 | 36 | 15 | 9 | 6 |

Note: Run at 72° F.
PPTG = Pounds per thousand gallons of oil-based fracturing fluid

TABLE 4

Breaker B at 72° F.

| Conc. (pptg) | Initial (cps) | 2 hrs. (cps) | 4 hrs. (cps) | 6 hrs. (cps) | 20 hrs. (cps) |
|---|---|---|---|---|---|
| 20 | 93 | 75 | 72 | 63 | 27 |
| 30 | 84 | 66 | 57 | 51 | 9 |
| 40 | 81 | 57 | 45 | 45 | 6 |
| 50 | 75 | 48 | 42 | 36 | 6 |

Diesel, commercial gellant, Fann 35A at 100 rpm
PPTG = Pounds per thousand gallons of fracturing fluid
cps = centipoise

TABLE 5

Breaker B at 105° F.

| Conc. (pptg) | Init. (cps) | 2 hrs. (cps) | 4 hr. (cps) | 6 hrs. (cps) | 20 hrs. (cps) |
|---|---|---|---|---|---|
| Blank | 150 | 135 | 129 | 111 | 90 |
| 10 | 150 | 144 | 108 | 99 | 81 |
| 20 | 147 | 93 | 99 | 87 | 60 |
| 20 | 141 | 87 | 90 | 87 | 54 |
| 30 | 138 | 84 | 87 | 81 | 30 |
| 30 | 132 | 84 | 90 | 87 | 42 |
| 40 | 123 | 78 | 72 | 72 | 12 |
| 40 | 126 | 84 | 84 | 78 | 24 |
| 50 | 105 | 72 | 66 | 54 | 9 |
| 50 | 120 | 63 | 60 | 48 | 12 |
| 60 | 90 | 60 | 48 | 36 | 9 |
| 60 | 114 | 63 | 57 | 39 | 9 |

Diesel, commercial gellant, Fann 35A at 100 rpm

TABLE 6

Breaker B at 125° F.

| Conc. (pptg) | Init. (cps) | 2 hrs. (cps) | 4 hr. (cps) | 6 hrs. (cps) | 20 hrs. (cps) |
|---|---|---|---|---|---|
| Blank | 141 | 132 | 120 | 117 | 78 |
| Blank | 135 | 135 | 126 | 111 | 96 |
| 5 | 141 | 120 | 114 | 111 | 78 |
| 10 | 141 | 120 | 114 | 111 | 78 |
| 10 | 138 | 118 | 102 | 93 | 78 |
| 15 | 144 | 115 | 96 | 90 | 63 |
| 20 | 135 | 48 | 6 | 6 | 6 |
| 20 | 150 | 112 | 93 | 84 | 39 |
| 30 | 135 | 6 | 6 | 6 | 6 |
| 40 | 135 | 6 | 6 | 6 | 6 |

Diesel, commercial gellant, Fann 35A at 100 rpm
PPTG = pounds per thousand gallons

TABLE 7

Calcium Hydroxide as a Breaker

| Conc. (pptg) | Init. VIS (cps) | 2 hrs. | 4 hr. | 6 hrs. | 20 hrs. |
|---|---|---|---|---|---|
| 0 | 99 | 102 | 99 | 93 | 75 |
| 8 | 102 | 96 | 93 | 90 | 75 |
| 12 | 96 | 96 | 90 | 90 | 45 |
| 16 | 93 | 93 | 87 | 84 | 9 |
| 20 | 93 | 69 | 51 | 33 | 9 |

Note: Run at 72° F.

In addition our formulations are relatively stable to shear, and to the presence of water, and they function to break viscosities at these low temperatures.

Having described my invention, I claim:

1. A method of breaking gelled viscosities of oil-based gelled fracturing fluids containing a gellant comprising aluminum complexes of alkyl phosphate esters and a proppant, which fracturing fluids are used in low-temperature formations having operating temperatures ranging between 60°–120° F. which comprises treating said oil-based gelled fracturing fluids with an effective viscosity breaking amount of a chemical breaker consisting essentially of an admixture of hydrated lime and sodium bicarbonate containing a weight ratio ranging between 100/0 to about 20/80 hydrated lime to sodium bicarbonate.

2. The method of claim 1 wherein the gelled fracturing fluid contains a diesel oil and wherein the low temperature formation has an operating temperature ranging from about 70°–115° F.

3. The method of claim 2 wherein the effective viscosity breaking amount of chemical breaker ranges between about 10–70 pounds/1,000 gallons of oil-based fracturing fluids and wherein the operating temperature ranges between about 75°–105° F.

4. In a method of fracturing low temperature oil bearing formations using an oil-based fracturing fluid containing a continuous oily liquid, a gellant, and a proppant, the improvement which comprises using as the gellant an effective amount of an aluminum alkyl phosphate ester to form a gelled fracturing fluid and then adding to the gelled fracturing fluid from 10–70 lbs./1,000 gals. of fracturing fluid of a chemical breaker which comprises a weight:weight admixture of from 100:0 to 20:80 of hydrated lime and sodium bicarbonate.

5. The method of claim 4 wherein the breaker is added at a dosage of from 15–50 lbs./1,000 gals.

6. The method of claim 4 wherein the breaker is added at a dosage of from 20–40 lbs./1,000 gals.

* * * * *